United States Patent
Kolding et al.

(10) Patent No.: US 12,170,972 B2
(45) Date of Patent: Dec. 17, 2024

(54) TIME SYNCHRONIZATION IN CELLULAR COMMUNICATION NETWORKS

(71) Applicant: Nokia Technologies Oy, Espoo (FI)

(72) Inventors: Troels Kolding, Klarup (DK); Kari Niemelä, Oulu (FI); Vladimir Vukadinovic, Wroclaw (PL); Stig Blücher Brink, Aalborg (DK); Amol Dhere, Gistrup (DK); Bent Henneberg Rysgaard, Aalborg (DK); Bo Holm Bjerrum, Nibe (DK); Rafhael Medeiros De Amorim, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 581 days.

(21) Appl. No.: 17/615,918

(22) PCT Filed: Jun. 4, 2020

(86) PCT No.: PCT/EP2020/065469
§ 371 (c)(1),
(2) Date: Dec. 2, 2021

(87) PCT Pub. No.: WO2020/245262
PCT Pub. Date: Dec. 10, 2020

(65) Prior Publication Data
US 2022/0330181 A1  Oct. 13, 2022

Related U.S. Application Data

(60) Provisional application No. 62/857,841, filed on Jun. 6, 2019.

(51) Int. Cl.
*H04W 56/00* (2009.01)
*H04W 12/0431* (2021.01)

(52) U.S. Cl.
CPC ..... *H04W 56/001* (2013.01); *H04W 12/0431* (2021.01)

(58) Field of Classification Search
CPC .......... H04W 56/001; H04W 12/0431; H04W 12/037; H04W 56/0015
See application file for complete search history.

(56) References Cited

U.S. PATENT DOCUMENTS

| | | |
|---|---|---|
| 2004/0240671 A1 | 12/2004 | Hu et al. |
| 2005/0010774 A1 | 1/2005 | Rose et al. |

(Continued)

FOREIGN PATENT DOCUMENTS

| | | |
|---|---|---|
| CN | 102045638 A | 5/2011 |
| JP | 2019-036995 A | 3/2019 |

(Continued)

OTHER PUBLICATIONS

"Introduction of TSN Sync soln #28A", SA WG2 Meeting #133, S2-1906610, Ericsson, May 13-17, 2019, pp. 1-7.

(Continued)

*Primary Examiner* — Kyaw Z Soe
(74) *Attorney, Agent, or Firm* — Robert P. Michal, Esq.; Carter, DeLuca & Farrell LLP (57) ABSTRACT

According to an example aspect of the present invention, there is provided a method comprising, embedding information for time synchronization to a SSB, encrypting the SSB and transmitting in a cellular communication network the encrypted SSB comprising the information for time synchronization.

20 Claims, 5 Drawing Sheets

(56) References Cited

U.S. PATENT DOCUMENTS

| | | |
|---|---|---|
| 2006/0146740 A1 | 7/2006 | Sheynman et al. |
| 2010/0153742 A1 | 6/2010 | Kuo et al. |
| 2013/0170507 A1 | 7/2013 | Hsueh et al. |
| 2015/0319151 A1 | 11/2015 | Chastain et al. |
| 2016/0373265 A1 | 12/2016 | Shah et al. |
| 2017/0064610 A1 | 3/2017 | Vangala et al. |
| 2018/0324740 A1 | 11/2018 | Edge et al. |
| 2022/0104154 A1* | 3/2022 | Wei .................. H04W 76/10 |
| 2022/0110155 A1* | 4/2022 | Chou ................. H04W 74/085 |
| 2022/0132453 A1* | 4/2022 | Wei .................. H04W 56/003 |
| 2022/0174630 A1* | 6/2022 | Wei ................. H04W 56/0015 |

FOREIGN PATENT DOCUMENTS

| | | |
|---|---|---|
| WO | 2015/049138 A1 | 4/2015 |
| WO | 2018/190992 A1 | 10/2018 |
| WO | 2018/206666 A1 | 11/2018 |
| WO | 2019/068957 A1 | 4/2019 |
| WO | 2019/096901 A1 | 5/2019 |
| WO | 2019/098677 A1 | 5/2019 |

OTHER PUBLICATIONS

"Ingress timestamp signalling", SA WG2 Meeting #133, S2-1906612, Qualcomm Incorporated, May 13-17, 2019, pp. 1-5.

"Summary of e-mail discussion: [105bis#18][NR/IIoT] Synchronisation (Nokia)", 3GPP TSG-RAN WG2 Meeting #106, R2-1907193, Agenda: 11.7.2.1, Nokia, May 13-17, 2019, 20 pages.

International Search Report and Written Opinion received for corresponding Patent Cooperation Treaty Application No. PCT/EP2020/065469, dated Oct. 1, 2020, 12 pages.

Office Action received for corresponding Chinese Patent Application No. 202080052786.5, dated Feb. 29, 2024, 8 pages of Office Action and English translation, 5 pages, total 13 pages.

"UE Time Synchronization", 3GPP TSG-RAN WG2 #103bis, R2-1814813, Agenda Item: 11.7.2, Ericsson, Oct. 8-12, 2018, 5 pages.

Office action received for corresponding Indian Patent Application No. 202247000213, dated Apr. 28, 2022, 5 pages.

* cited by examiner

FIGURE 1

| Device category | Delivery method for SYNC | | | Device characteristic | | |
| --- | --- | --- | --- | --- | --- | --- |
| | SSB + mCE | MIB/SIB capability | RRC + TA adjustment mechanism | Power consumption | Cost | Accuracy |
| Cat-S I | YES | NO | NO | Lowest | Lowest | ~ 1ms |
| Cat-S II | YES | YES | NO | Low | Lowest | < 1ms |
| Cat-S III | YES | YES | YES | Medium | Medium | < 1us |

TIME SYNCHRONIZATION IN CELLULAR COMMUNICATION NETWORKS

RELATED APPLICATION

This application claims priority to PCT Application No. PCT/EP2020/065469, filed on Jun. 4, 2020, which claims priority to U.S. Application No. 62/857,841, filed on Jun. 6, 2019, the contents of each of which is incorporated herein by reference in its entirety.

FIELD

Various example embodiments relate in general to cellular communication networks, and more specifically to time synchronization in such networks.

BACKGROUND

Time synchronization plays a crucial role in many communication networks, including both, wireless and wired communication networks. In general, time synchronization is needed for coordinating independent clocks of different network entities in a communication network, to achieve a common understanding of time. The issue is that independent clocks will start to drift from each other over time, thereby leading to significant differences in time, if time synchronization is not performed regularly.

For instance, time synchronization is very important in cellular communication networks, such as in networks operating according to Long Term Evolution, LTE, and/or 5G radio access technology. 5G radio access technology may also be referred to as New Radio, NR, access technology. Since its inception, LTE has been widely deployed and 3rd Generation Partnership Project, 3GPP, still develops LTE. Similarly, 3GPP also develops standards for 5G/NR. One of the topics in the 3GPP discussions is related to time synchronization and according to the discussions there is a need to provide improved methods, apparatuses and computer programs for performing time synchronization in cellular communication networks.

SUMMARY

According to some aspects, there is provided the subject-matter of the independent claims. Some embodiments are defined in the dependent claims. The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect of the present invention, there is provided a method comprising embedding information for time synchronization to a SSB, encrypting the SSB and transmitting in a cellular communication network the encrypted SSB comprising the information for time synchronization.

According to a second aspect of the present invention, there is provided a method comprising, receiving, from a base station in a cellular communication network, an encrypted SSB comprising information for time synchronization, decrypting the encrypted SSB and retrieving, from the decrypted SSB, the information for time synchronization.

According to a third aspect of the present invention, there is provided an apparatus comprising at least one processing core, at least one memory including computer program code, the at least one memory and the computer program code being configured to, with the at least one processing core, cause the apparatus at least to perform, embed information for time synchronization to a SSB, encrypt the SSB and transmit in a cellular communication network the encrypted SSB comprising the information for time synchronization.

According to a fourth aspect of the present invention, there is provided an apparatus comprising at least one processing core, at least one memory including computer program code, the at least one memory and the computer program code being configured to, with the at least one processing core, cause the apparatus at least to perform, receive, from a base station in a cellular communication network, an encrypted SSB comprising information for time synchronization, decrypt the encrypted SSB and retrieve, from the decrypted SSB, the information for time synchronization.

According to a fifth aspect of the present invention, there is provided an apparatus comprising means for embedding information for time synchronization to a SSB, means for encrypting the SSB and means for transmitting in a cellular communication network the encrypted SSB comprising the information for time synchronization.

According to a sixth aspect of the present invention, there is provided an apparatus comprising means for receiving, from a base station in a cellular communication network, an encrypted SSB comprising information for time synchronization, means for decrypting the encrypted SSB and means for retrieving, from the decrypted SSB, the information for time synchronization.

According to a seventh aspect of the present invention, there is provided a non-transitory computer readable medium having stored thereon a set of computer readable instructions that, when executed by at least one processor, cause an apparatus to at least perform, embedding information for time synchronization to a SSB, encrypting the SSB and transmitting in a cellular communication network the encrypted SSB comprising the information for time synchronization.

According to an eighth aspect of the present invention, there is provided a non-transitory computer readable medium having stored thereon a set of computer readable instructions that, when executed by at least one processor, cause an apparatus to at least perform, receiving, from a base station in a cellular communication network, an encrypted SSB comprising information for time synchronization, decrypting the encrypted SSB and retrieving, from the decrypted SSB, the information for time synchronization.

According to a ninth aspect of the present invention, there is provided computer program configured to perform, embedding information for time synchronization to a SSB, encrypting the SSB and transmitting in a cellular communication network the encrypted SSB comprising the information for time synchronization.

According to a tenth aspect of the present invention, there is provided computer program configured to perform, receiving, from a base station in a cellular communication network, an encrypted SSB comprising information for time synchronization, decrypting the encrypted SSB and retrieving, from the decrypted SSB, the information for time synchronization.

EMBODIMENTS

Time synchronization in cellular communication networks may be improved by the procedures described herein. More specifically, embodiments of the present invention enable access to synchronization services by low-cost User Equipments, UEs, while also making it possible for a cellular communication network to control access to different synchronization services. For instance, information for time synchronization may be embedded to a Synchronization Signal Block, SSB, and/or a System Information Block, SIB. The entire SSB and/or SIB comprising the information for time synchronization may be encrypted and then transmitted. Also, in some embodiments the information for time synchronization may be transmitted using Radio Resource Control, RRC, signaling as well, for enabling better time synchronization accuracy.

In general, the information for time synchronization may comprise an absolute time, for example a time reference, such as a time stamp taken at the Base Station, BS, at the time of transmission of a message. In some embodiments, the information for time synchronization may comprise a part of the absolute time, such as millisecond and $\frac{1}{10}$ millisecond fields. That is to say, the information for time synchronization may comprise a full time in a certain message or partial components of time that may need to be stitched together. Moreover, in some embodiments, the provided absolute time may relate to an event, the event being such that a UE knows when the event happened. For instance, the event may refer to a boundary of a last System Frame Number, SFN, or to a boundary of a next SFN. In some embodiments, the information for time synchronization may be linked to a certain time domain, such as Coordinated Universal Time, UTC, or UNIX Epoch Time.

Figure 1:
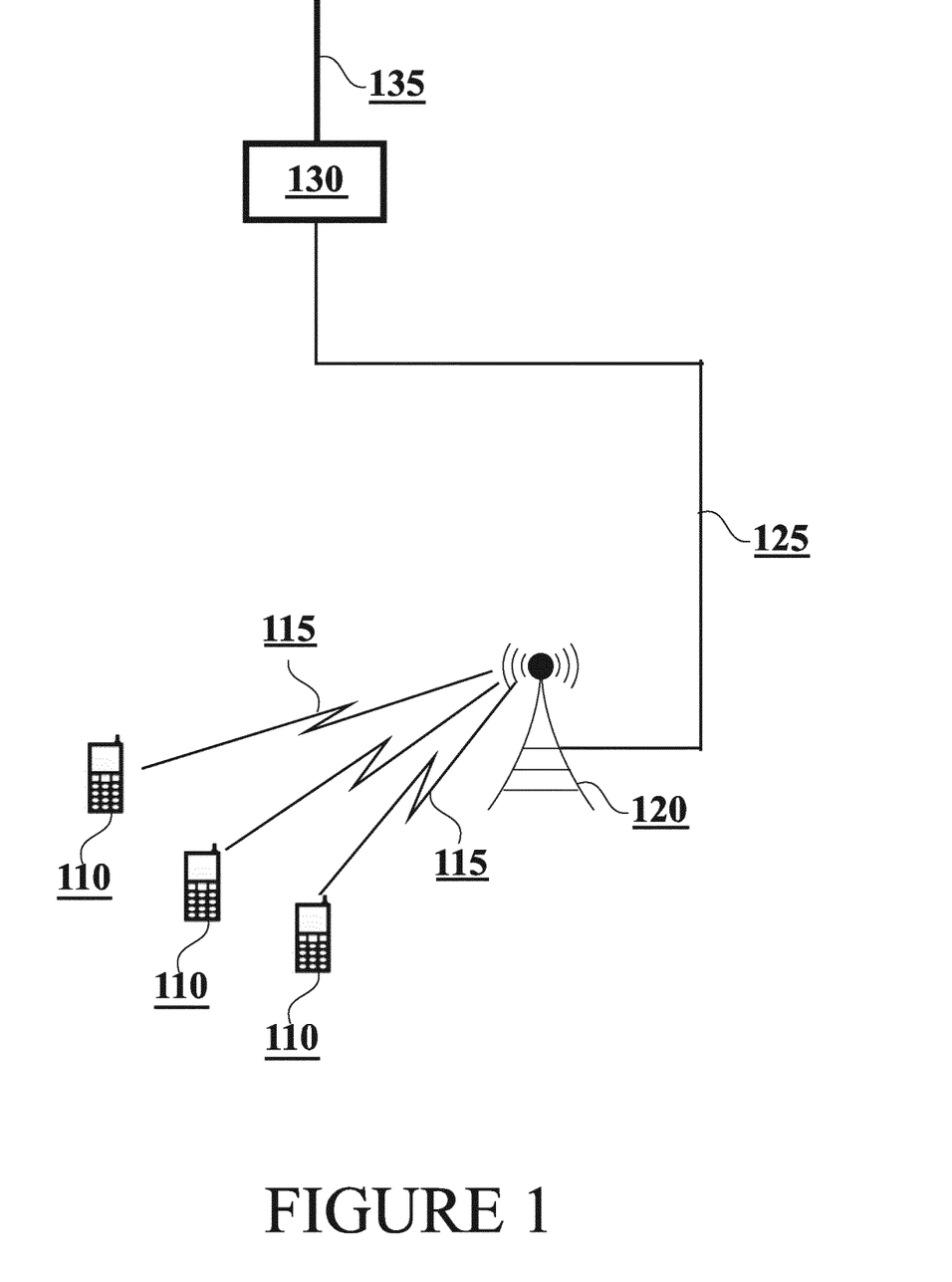
FIG. 1 illustrates an exemplary communication network scenario in accordance with at least some example embodiments.

FIG. 1 illustrates an exemplary communication network scenario in accordance with at least some example embodiments. According to the exemplary scenario of FIG. 1, there may be a cellular communication network, which comprises one or more UEs 110, one or more BSs 120, and core network element 130. UEs 110 may be connected to BS 120 via air interface 115.

UEs 110 may comprise, for example, a smartphone, a cellular phone, a Machine-to-Machine, M2M, node, Machine-Type Communications node, MTC, an Internet of Things, IoT, node, a car telemetry unit, a laptop computer, a tablet computer or, indeed, any kind of suitable wireless terminal or station. In the exemplary communication network scenario of FIG. 1, UEs 110 may communicate wirelessly with BS 120, or with a cell of BS 120, via air interface 115. In some embodiments, BS 120 may be considered as a serving BS for UEs 110.

BS 120 may be connected, directly or via at least one intermediate node, with core network 130 via interface 125. Core network 130 may be, in turn, coupled via interface 135 with another network (not shown in FIG. 1), via which connectivity to further networks may be obtained, for example via a worldwide interconnection network. BS 120 may be connected with at least one other BS as well via an inter-BS interface (not shown in FIG. 1), even though in some embodiments the inter-BS interface may be absent. BS 120 may be connected, directly or via at least one intermediate node, with core network 130 or with another core network.

Air interface 115 between UEs 110 and BS 120 may be configured in accordance with a Radio Access Technology, RAT, which UEs 110 and BS 120 are configured to support. Examples of cellular RATs include Long Term Evolution, LTE, New Radio, NR, which may also be known as fifth generation, 5G, radio access technology and MulteFire. For example, in the context of LTE, BS 120 may be referred to as eNB while in the context of NR, BS 120 may be referred to as gNB. In any case, embodiments of the present invention are not restricted to any particular cellular communication technology. Instead, embodiments of the present invention may be exploited in any cellular communication network, wherein time synchronization is carried out via the cellular communication network.

Time synchronization is a critical feature for many applications and the required accuracy depends on the application in question. Time synchronization via a cellular communication network may be a preferred solution in many cases, if for example Global Positioning System, GPS, is unstable or not available (e.g., deep indoors). Also, time synchronization via a cellular communication network may be a preferred solution over systems using dedicated time signal stations that may be unavailable or insufficient in terms of accuracy. In addition, alternative stand-alone synchronization systems may not be able to provide sufficient security, cost, etc.

In the context of 5G/NR, the aim is that the cellular communication network would be able to synchronize UEs to a time source with an accuracy of less than 1 microsecond, at least for small deployment scenarios, such as within a factory. For a wide area deployment in outdoors, accuracies from 10 to 20 microseconds, or even 100 microseconds, may be tolerable. Therefore, time synchronization via cellular communication networks should be sufficient for meeting the demands of most imaginable situations, comprising house-hold appliances, industrial networking, smart grids, basic watches, etc. Moreover, cellular communication networks may be used for time synchronization in deep indoor deployments, wherein alternative solutions may be unattractive.

Nevertheless, there are also challenges concerning time synchronization via cellular communication networks. As an example, accessibility and cost of synchronization services may be an issue. In some cellular communication networks, such as in networks operating in accordance with 5G/NR standard, deployment may be bundled with data services. In such a case, a dedicated time synchronization solution or another clock may be an overkill and too expensive for such a subscription model.

Moreover, fully standard compliant UEs, such as 5G/NR compliant UEs, may require full modem implementation, which means that a cost of a UE's modem may be higher than needed for synchronization services. The cost of the modem may comprise, e.g., material cost, design cost and royalty costs for embedded patents. In addition, full modem implementation may require much higher form factor and power consumption than needed.

In addition, it may be desirable, e.g., by an operator of a cellular communication network, to control access to synchronization services. For instance, an operator may have deployed a powerful infrastructure for the synchronization service but may be unable to control the synchronization service, e.g., for low-cost devices, if the cellular communication network is not able to control access to the synchronization service. Such control may be needed for example to prevent unauthorized use.

Embodiments of the present invention therefore address various challenges related to providing time synchronization via cellular communication networks, such as 5G/NR networks. For instance, some embodiments enable access to synchronization services by low-end UEs. In addition, or alternatively, some embodiments enable controlling access to synchronization services, e.g., by using a subscription/registration model.

According to at least some embodiments, time synchronization may be performed via a cellular communication network. Even though embodiments of the present invention are described mainly in the context of 5G/NR, it should be noted that the embodiments may be applied in any cellular communication network, possibly operating in accordance with a 3rd Generation Partnership Project, 3GPP, standard.

In some embodiments, device categories for time synchronization, such as 5G Cat-S device classes, may be provided. Said device categories may be cost- and form-factor optimized for synchronization services. For instance, said device categories may comprise low-accuracy classes and UEs belonging to the low-accuracy classes may be able to read SSB, and potentially SIB messages as well.

However, in some embodiments, the UEs belonging to the low-accuracy classes may not be capable of transmitting to the cellular communication network directly. Thus, UEs belonging to the low-accuracy classes may not be able to perform Timing Advance, TA, compensation to achieve very high time synchronization accuracies. Nevertheless, accuracies of about 1 millisecond may be possible anyway, and even better accuracies for the UEs that are able to read SIB messages.

Moreover, in some embodiments, said device categories may comprise a high-accuracy class. UEs belonging to the high-accuracy class may be able to read SSB and SIB messages, and also to receive Radio Resource Control, RRC, messages. In addition, the UEs belonging to the high-accuracy class may be able to transmit Sounding Reference Signals, SRSs. However, according to some embodiments, the UEs belonging to the high-accuracy class may have limited support, or no support at all, for transmitting data payloads in uplink and/or receiving data payloads in downlink. In some embodiments, the UEs belonging to the high-accuracy class may be able to request an alternative, or additional, time synchronization service as well, out of a set of time synchronization services provided by the cellular communication network.

Moreover, in some embodiments, encryption may be used to prevent unauthorized access to synchronization services provided by the cellular communication network and also to control access to the synchronization services by an operator of the cellular communication network. In addition, or alternatively, UEs may be provisioned with registration keys and security elements to enable dynamic updating of the keys that are used for encryption/decryption over time.

Some embodiments also provide a scalable solution, wherein different levels of access may be assigned for UEs belonging to different device categories for time synchronization, thereby increasing (or decreasing) the quality of time synchronization. Thus, the different levels of access may be used to provide different time synchronization accuracies. That is to say, different time synchronization accuracies may be provided for UEs belonging to different device categories.

Figure 2:
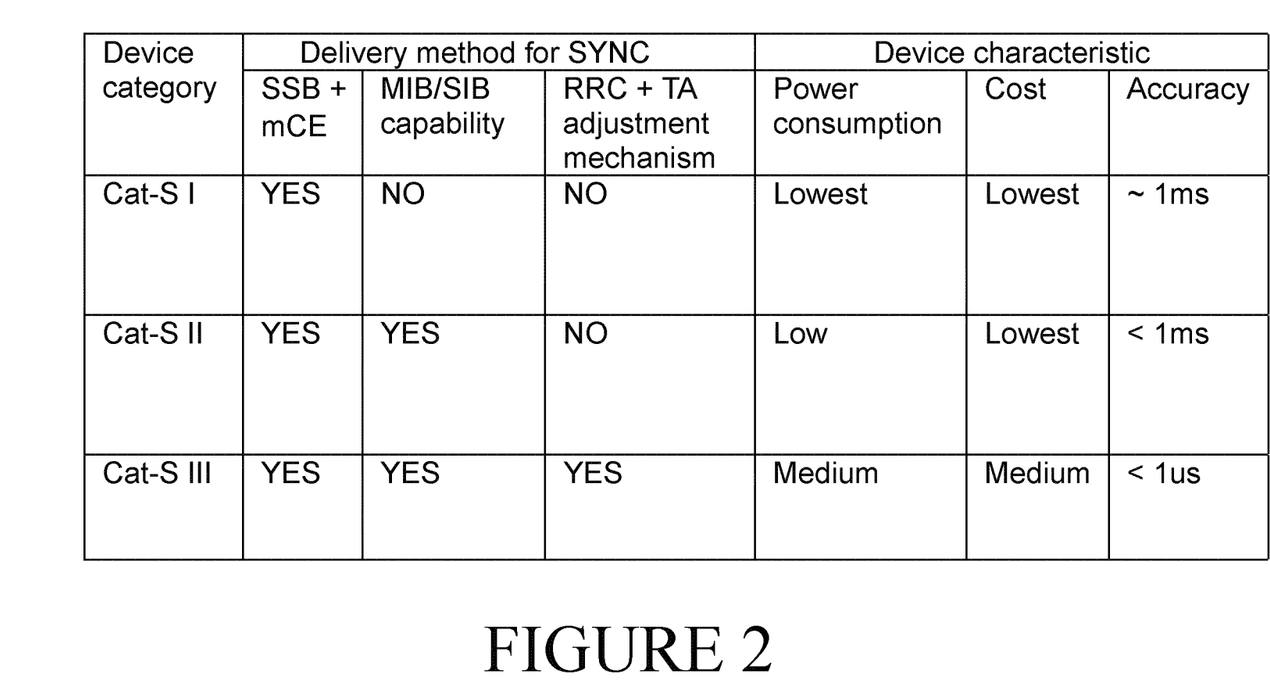
FIG. 2 illustrates exemplary device categories in accordance with at least some embodiments.

FIG. 2 illustrates exemplary device categories in accordance with at least some embodiments. In FIG. 2, device category CAT-S I is an example of a first device category for time synchronization, which may be referred to as a low-accuracy class. Device category CAT-S II is an example of a second device category for time synchronization, which may be referred to as a low-accuracy class as well. Device category CAT-S III is an example of a third device category for time synchronization, which may be referred to as a high-accuracy class.

In some embodiments, lowest time synchronization accuracy may be provided for, or achieved by, UEs that belong to the first device category for time synchronization, e.g., time synchronization accuracy may be about 1 millisecond. Then, the time synchronization accuracy provided for, or achieved by, UEs that belong to the second device category for time synchronization may be higher compared to UEs that belong to the first device category, e.g., time synchronization accuracy may be less than 1 millisecond. Finally, highest time synchronization accuracy may be provided for, or achieved by, UEs that belong to the third device category for time synchronization, e.g., time synchronization accuracy may be less than one microsecond.

Connectivity needs for accessing different time synchronization services may vary as well for different device categories for time synchronization. In some embodiments, UEs that belong to the first device category (e.g., CAT-S I) or the second device category (e.g., CAT-S II) may be idle and not visible directly to a cellular communication network, such as a 5G/NR network. On the other hand, UEs that belong to the third device category (e.g., CAT-S III) may be connected, or connectable, to the cellular communication network, such as 5G/NR network, and possibly registered via a 5G/NR network for example.

Different device categories for time synchronization may be used to provide different trade-offs among implementation cost, power consumption and form factor. FIG. 2 demonstrates an example of three such categories, but naturally there may be various alternatives, wherein less than three categories or more than three categories may be used. In general, the device categories for time synchronization demonstrated in FIG. 2 mean that the cellular communication network may know what kind of delivery method(s) may be assumed to be available for delivering information for time synchronization to at least one UE.

In some embodiments, information for time synchronization may be provided to UEs that belong to the first device category (e.g., CAT-S I) by transmitting a SSB comprising the information for time synchronization. More specifically, in some embodiments, messageClassExtension, mCE, of the Broadcast Control Channel, BCCH, Broadcast Channel, BCH, -Message may comprise the information for time synchronization. Thus, optimized synchronization for UEs that require very low power consumption may be provided. Cost may be the same as for UEs belonging to the other low-cost category, i.e., the second device category for time synchronization (e.g., CAT-S II).

The UEs that belong to the first device category (e.g., CAT-S I) may be implemented with a Physical Broadcast Channel, PBCH, receiver only, e.g., if the mCE of a BCCH-BCH-Message is used for transmitting the information for time synchronization, instead of a SIB for example. Thus, even with a low-cost Temperature-Controlled Crystal Oscillator, TXCO, it would be sufficient to encode millisecond and 1/10 millisecond fields only (14 bits) and transmit those in every Xth SSB, instead of Master Information Block, MIB. Thus, the UEs that do not belong to any of the device categories for time synchronization (i.e., Non-CAT-S UEs) would ignore the SSBs that are associated with the information for time synchronization.

As UEs that belong to the first device category for time synchronization (e.g., CAT-S I) or the second device category for time synchronization (e.g., CAT-S II) may be idle and not visible directly to a cellular communication network, such as a 5G/NR network, such UEs may not have a 5G/NR transmission chain as a part of the UE. Instead, such UEs may have a 5G/NR receiver chain only, thereby significantly reducing cost (both material as well as royalty cost). Also, power consumption performance is enhanced. On the other hand, UEs that belong to the first device category for time synchronization (e.g., CAT-S I) or the second device category for synchronization (e.g., CAT-S II) may not be able to achieve the best time synchronization accuracy that could be possible via the cellular communication network. Nevertheless, time synchronization accuracy in the order of 1 millisecond, or even better, may be achievable within any coverage area of the cellular communication network, including full wide area coverage.

That is to say, UEs that belong to the first device category for time synchronization (e.g., CAT-S I) may only have a capability to receive SSBs (e.g., along with the mCE comprising the information for time synchronization) while UEs that belong to the second device category synchronization (e.g., CAT-S II) may have a capability to receive SSBs (e.g., along with the mCE comprising the information for time synchronization) and SIB messages comprising the information for time synchronization. However, there can be no TA-based propagation delay compensation without uplink transmission, and thus it may be difficult, if not impossible, to reach microsecond synchronization accuracies. In practice, the time synchronization accuracy would be thus limited by a propagation delay ambiguity to a nearest cell. The time synchronization accuracy may be, e.g., for most "city cells", less than 100 microseconds (e.g., delay of 333 nanoseconds for a distance of 100 meters), which may be fine for most purposes.

UEs that belong to the third device category for time synchronization (e.g., CAT-S III) may be referred to as high-accuracy devices. Such UEs may still be significantly differentiated in terms of cost from other UEs, as data capabilities of UEs that belong to the third device category may be limited. The UEs that belong to the third device category may need to transmit information to the cellular communication network to be configured. For instance, as a minimum such UEs may need to be configured for sending, e.g., Sounding Reference Signals, SRS, and for receiving additional synchronization messages delivered using RRC signaling. Nevertheless, data transmissions may not be a strict requirement, although optionally it may be possible to send some data as well.

The cellular communication network may perform some actions to improve the time synchronization performance, functionality and/or cost of the UEs that belong to any of the device categories for time synchronization, i.e., CAT-S UEs. For instance, the use of the SSB along with mCEs comprising information for time synchronization may be used to allow further power consumption reduction for UEs that belong to the first device category for time synchronization (e.g., CAT-S I). The format of the BCCH-BCH-Message, carried by the SSB, possibly along with mCEs comprising information for time synchronization, may be similar compared to SIB/RRC messaging, but the SSB (possibly comprising the mCE) message may be compressed further as sub-microsecond time synchronization accuracies are not required. In some embodiments, use of the mCE may allow a BCCH-BCH-Message to contain information other than MIB, such as time synchronization information.

Moreover, for UEs that belong to the third device category for time synchronization (e.g., CAT-S III), RRC signaling may be used by the cellular communication network to announce available clock services, such as if different clock types or time scales are offered by the cellular communication network. For instance, if the cellular communication network sells a certain clock service to a vertical that uses its own proprietary clock domain, the cellular communication network may use RRC signaling for announcing that.

Alternatively, or in addition, UEs that belong to the third device category for time synchronization (e.g., CAT-S III) may request a certain clock service from the cellular communication network, which then triggers the cellular communication network to distribute time synchronization messages for the requested clock service, e.g., in a mobility region of the UE that requested the clock service. The mobility region may comprise for example a current cell and cells in a candidate set for a handover. Thus, the cellular communication network may transmit time synchronization information for the requested clock service only in cells where the requested clock service is needed.

The low-cost of the UEs that belong to the first device category (e.g., CAT-S I) or the second device category (e.g., CAT-S II) may prevent the UEs from registering via traditional means to the cellular communication network, because such UEs may not be able to transmit to the cellular communication network directly over air interface. Thus, the cellular communication network would not have information about the UEs that require a certain synchronization service. If only one time synchronization service, e.g., clock domain, such as a UTC is offered, it may not be an issue to transmit such time synchronization service over the entire cellular communication network all the time.

Nevertheless, in some embodiments registration may be required. There may thus be an alternative registration procedure for UEs that belong to the first device category for time synchronization (e.g., CAT-S I) or the second device category for time synchronization (e.g., CAT-S II), thereby making it possible for the cellular communication network to transmit a time synchronization service for a certain time domain or a geographical area, wherein or whenever the time synchronization service in question is needed. Efficiency of the cellular communication may be therefore improved, as unnecessary transmissions can be avoided.

For instance, UEs that belong to the first device category for time synchronization (e.g., CAT-S I) or the second device category for time synchronization (e.g., CAT-S II) may use alternative registration procedure such as:

In case of semi-statically located UEs, the UE may report an identity of its cell to the network via an alternate backend access, such as an Universal Serial Bus, USB, connection to an Internet connected Personal Computer, PC, Bluetooth, WLAN/Wi-Fi, or other any other suitable access method. In some embodiments, the data, such as cell identities, may be initially collected by a synchronization registration service located within a core network of an operator, or operators, and then used as a part of the management and orchestration function to provision a certain synchronization service in a certain geographical area.

For high-mobility UEs, such registration may be useful as well in order to inform the cellular communication network that a certain time synchronization service is being consumed or there is a need to activate a time synchronization service. For instance, if multiple time synchronization services are supported and the cellular communication network would like to reduce the signaling to only those time synchronization services that are being used, or needed.

In some embodiments, encryption of synchronization messages, such as MIB/SIB and/or SSB (possibly comprising the mCE) messages, may be used as well. For instance, if an operator rolls out an infrastructure offering at least one synchronization service, it may be desirable to control access to the at least one synchronization service, e.g., to avoid unauthorized use.

In general, encryption may be implemented in various ways. Typically, a requirement is that the UE knows the encryption key and hence is able to decrypt synchronization messages that have been encrypted with the encryption key in question. On the other hand, any UE that does not know the encryption key cannot decrypt such synchronization message, thereby making it possible for the cellular communication network, or an operator of the cellular communication network, to prevent unauthorized access to the time synchronization service.

In some embodiments, a first encryption key associated with a first time synchronization service may be used for encryption/decryption of SSB (possibly comprising the mCE) messages. That is to say, UEs belonging to the first device category (CAT-S I) may use the first encryption key for decrypting encrypted SSBs. Similarly, a second encryption key associated with a second time synchronization service may be used for encryption/decryption of SIB messages. That is to say, UEs belonging to the second device category (CAT-S II) may use the second encryption key for decrypting encrypted SIBs while such UEs may also use the first encryption key for decrypting encrypted SSBs.

Certain challenges may be related to controlling access, delivery of keys and encryption. For instance, for low-cost UEs it would be good to avoid having encryption elements and processing, to minimize the cost. Moreover, as in some embodiments a SSB (possibly comprising the mCE) and/or SIB message is broadcasted, all the UEs may share the key. Thus, there may be a risk that a poorly implemented UE, e.g., a cheap alarm clock, may leak the encryption key, thereby compromising access to the synchronization service. That is to say, if the encryption key is leaked, the cellular communication network would not have full access control anymore. Thus, it may be required that the UEs belonging to the first device category for time synchronization (e.g., CAT-S I) or the second device category for time synchronization (e.g., CAT-S II) also perform registration to the cellular communication network to avoid such issues.

In some embodiments, a new configuration of a SIM module may be used (Universal Integrated Circuit Card, UICC). For instance, the above mentioned issues may be prevented by ensuring that the SIM is the trusted environment. The SIM may be provided, and thus controlled, by an operator of the cellular communication network for insertion into UEs that belong to any of the device categories for time synchronization (CAT-S I, II and III). As the amount information for time synchronization that has been encrypted, i.e., protected, is small, the information may be decrypted by the SIM itself because the SIM has enough processing power for performing the decryption. Typically, the SIM is only used for establishing the keys for encryption/decryption, but according to some embodiments, the information for time synchronization is loaded to the SIM for local processing and then delivered back decrypted. Thus, in some embodiments, the SIM may perform the decryption.

In some embodiments, the SIM may need to be updated over time to maintain the encryption key, thereby making it possible for the cellular communication network to update the encryption key, if needed. The updating of the encryption key may be performed in various ways, for example depending on whether a UE belongs to the first/second device category (e.g., CAT-S I/CAT-S II), or to the third device category (e.g., CAT-S III).

UEs belonging to the third device category (e.g., CAT-S III) may have a capability to exchange information with the cellular communication network, e.g., via a 5G/NR modem. Thus, the SIM may for example perform negotiations about its encryption directly with the cellular communication network, e.g., through SAT class e connections. SAT class e may refer to a method for the SIM, wherein the SIM itself may establish a data connection to the cellular communication network via a UE. The UE may not be aware of content or a reason behind the data connection. Example use cases for SAT class e may comprise, e.g., the SIM acting as a Hypertext Transfer Protocol, HTTP, server, the SIM downloading new information, etc. Typically the UE may need to allow the data connection and support the feature "SAT class e" to enable such operation.

Consequently, the SIM may itself enable the context when the file is downloaded to the SIM. The cellular communication network is therefore in complete control via the SIM. So if for example a subscription is canceled, errors would occur when trying to read the decrypted information. In case of UEs belonging to the third device category (e.g., CAT-S III), also the UE itself (i.e., not the SIM) could maintain in memory of the UE the encryption key provided by the cellular communication network, or an operator of the cellular communication network, provided the UE in question is trusted. In such a case, RRC or other signaling may be used to exchange security parameters, such as encryption keys, with the cellular communication network. On the other hand, UEs belonging to the first device category (e.g., CAT-S I) or the second device category (e.g., CAT-S II) may use an alternative backend access, such as USB, connection to an Internet connected PC Bluetooth, WLAN/Wi-Fi, for exchanging encryption keys.

According to some embodiments, the following process may be used for exchanging encryption keys. First, the cellular communication network may exchange Broadcast Access Key, BAK, credentials with the SIM/UICC of the UE in question. For this, UEs belonging to the first device category (e.g., CAT-S I) or the second device category (e.g., CAT-S II) may use the alternative backend access and UEs belonging to the third device category (e.g., CAT-S III) may use direct connection to the cellular communication network, such as a 5G network. In both cases, a registration key may be used to ensure that both, the UE and the cellular communication network, are mutually authenticated. Then, the cellular communication network may encrypt the SSB (possibly comprising the mCE) and/or SIB messages comprising the information for time synchronization using a short term key associated with the BAK, and then broadcast the encrypted message(s). In some embodiments, a random value may also be transmitted along with the encrypted message(s).

Then, the UE, or the UICC of the UE, may derive the short term key using the BAK and decrypt the encrypted message(s) comprising the information for time synchronization. Consequently, the UE may retrieve the information for time synchronization from the decrypted message(s) and use the retrieved information for time synchronization. Also, in some embodiments, the UE, or the UICC of the UE, may use the broadcasted random value for deriving the short term key. In some embodiments, the short term key is not transmitted over air interface but it may be derived from the BAK, e.g., using the random value.

In some embodiments, a scalable service access model may be provided as well. For example, the cellular communication network may wish to control access to different levels of time synchronization, i.e., for different time synchronization accuracies. Thus, the cellular communication network may decide not to encrypt, e.g., every $100^{th}$ SIB messages comprising information for time synchronization. Alternatively, or in addition, the cellular communication network may decide not to encrypt all SSB (possibly comprising the mCE) messages comprising the information for time synchronization.

Moreover, in some embodiments, every $10^{th}$ SIB message comprising the information for time synchronization may be encrypted using a first short term key and, and possibly a first registration key as well, thereby allowing access to the every $10^{th}$ SIB message using the first short term key, and possibly the first registration key as well. Then, all SIB messages comprising the information for time synchronization may be encrypted using a second short term key, and possibly a second registration key as well, thereby allowing access to the all SIB messages using the second short term key, and possibly the second registration key as well. In general, short term keys may be referred to as encryption keys in at least some embodiments. Moreover, in some embodiments, additional RRC signaling/messages may be transmitted for very accurate time synchronization, which may come as an add-on with the subscription of the UE, or the SIM of the UE.

Figure 3:
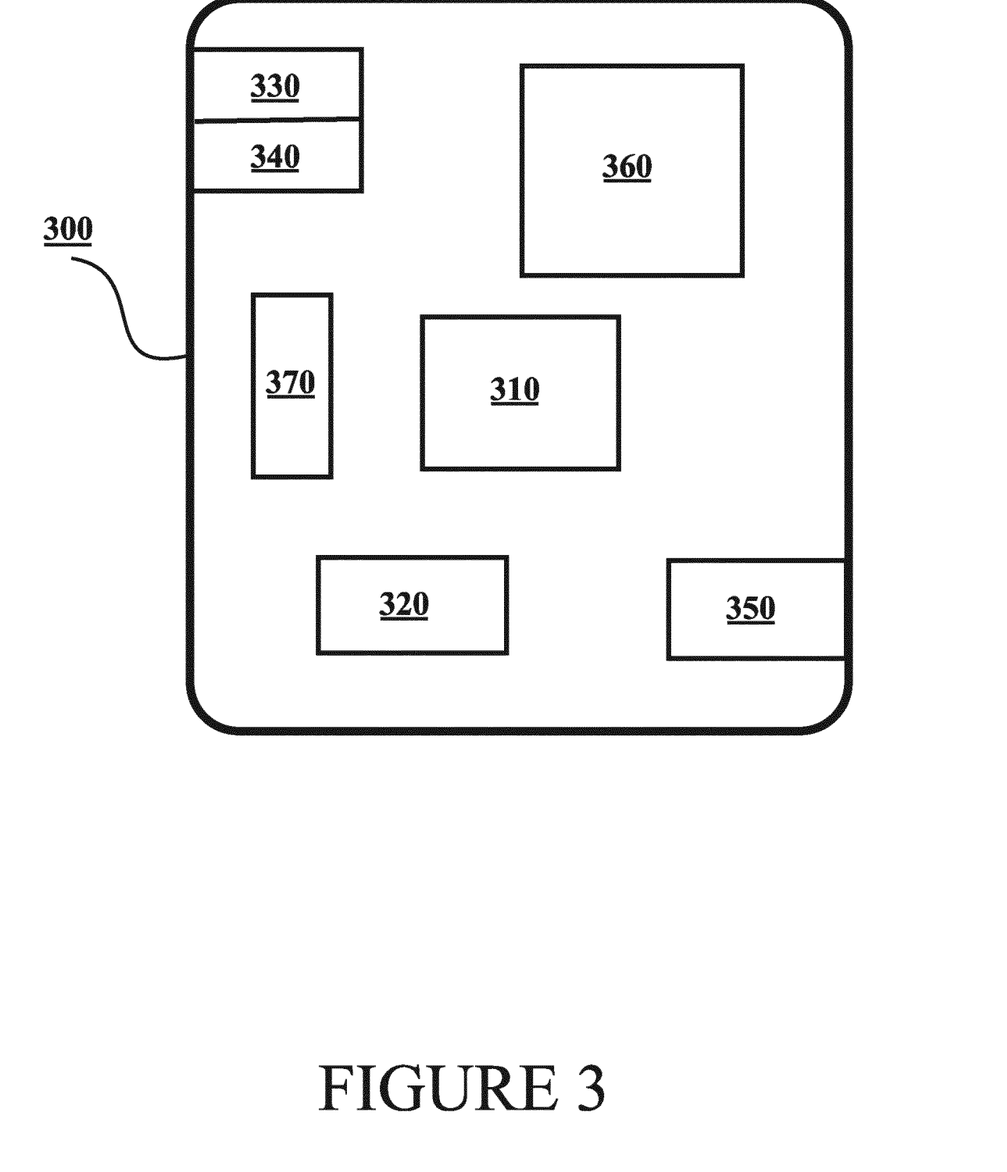
FIG. 3 illustrates an example apparatus capable of supporting at least some embodiments.

FIG. 3 illustrates an example apparatus capable of supporting at least some embodiments. Illustrated is device 300, which may comprise, for example, UE 110, BS 120, or a cell of target BS 120, or a device controlling functioning thereof. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Global System for Mobile communication, GSM, Wideband Code Division Multiple Access, WCDMA, 5G, Long Term Evolution, LTE, IS-95, Wireless Local Area Network, WLAN, Ethernet and/or Worldwide Interoperability for Microwave Access, WiMAX, standards, for example.

Device 300 may comprise a Near-Field Communication, NFC, transceiver 350. NFC transceiver 350 may support at least one NFC technology, such as Bluetooth, Wibree or similar technologies.

Device 300 may comprise User Interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a Subscriber Identity Module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the embodiments.

Figure 4:
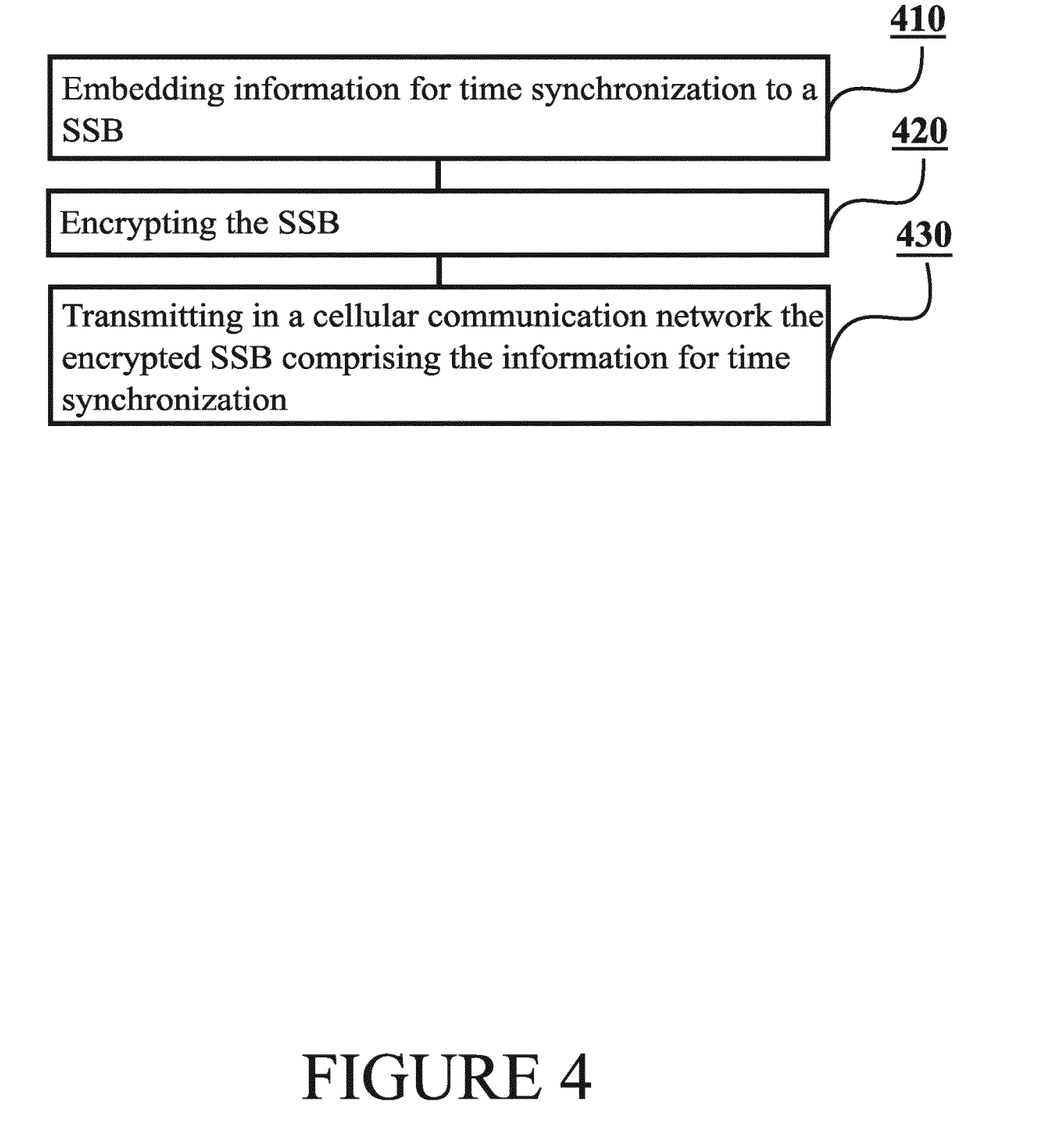
FIG. 4 illustrates a flow graph of a first method in accordance with at least some embodiments.

FIG. 4 is a flow graph of a first method in accordance with at least some embodiments. The phases of the illustrated first method may be performed by BS 120 or by a control device configured to control the functioning thereof, possibly when installed therein.

The first method may comprise, at step 410, embedding information for time synchronization to a SSB. The first method may also comprise, at step 420, encrypting the SSB. Finally, the first method may comprise, at step 430, transmitting in a cellular communication network the encrypted SSB comprising the information for time synchronization.

In some embodiments, the information for time synchronization may be embedded to a BCCH-BCH-Message. Alternatively, or in addition, the SSB may be encrypted using a first encryption key associated with a first time synchronization service, such as CAT-S I.

In some embodiments, the first method may comprise embedding the information for time synchronization to a SIB, encrypting the SIB and transmitting the encrypted SIB in the cellular communication network. In some embodiments, the SIB may be encrypted using a second encryption key associated with a second time synchronization service, such as CAT-S II.

In some embodiments, the first method may comprise transmitting the information for time synchronization using RRC signaling, in addition to transmitting the encrypted SIB and the encrypted SSB.

In some embodiments, the encrypted SSB may be transmitted to at least one UE belonging to a first device category for time synchronization and the encrypted SIB may be transmitted in addition to the encrypted SSB to at least one UE belonging to a second device category for time synchronization. In some embodiments, less accurate time synchronization may be provided to, or achieved by, the at least one UE belonging to the first device category for time synchronization than the at least one UE belonging to the second device category for time synchronization.

In some embodiments, the information for time synchronization may be transmitted using RRC signaling, in addition to the encrypted SIB and the encrypted SSB, to at least one UE belonging to the third device category for time synchronization. In some embodiments, less accurate time synchronization may be provided to, or achieved by, the at least one UE belonging to the second device category for time synchronization than the at least one UE belonging to the third device category for time synchronization.

In some embodiments, the at least one UE belonging to the first or second device category for time synchronization may not be capable of performing uplink transmissions and the at least one UE belonging to the third device category for time synchronization may be able to perform uplink transmissions.

In some embodiments, the first method may comprise, receiving from at least one UE belonging to the first device category for time synchronization, a registration request for a first time synchronization service and/or a request for a first broadcast access key of the first time synchronization service via a first backend connection. The method may also comprise transmitting, in response to receiving the request(s), a registration key and/or the broadcast access key of the first time synchronization service via the first backend connection to the at least one UE belonging to the first device category.

In some embodiments, the first method may comprise, receiving from at least one UE belonging to the second device category for time synchronization, a registration request for a second time synchronization service and/or a request for a broadcast access key of the second time synchronization service via a second backend connection. The method may also comprise transmitting, in response to receiving the request(s), a registration key and/or the broadcast access key of the second time synchronization service via the second backend connection to the at least one UE belonging to the second device category.

In some embodiments, the first method may comprise, receiving from a UE belonging to the third device category, a registration request for a third time synchronization service and/or a request for a broadcast access key of the third time synchronization service via the cellular network. The method may also comprise transmitting, in response to receiving the request(s), the registration key and/or the broadcast access key of the third time synchronization service via the cellular network to the UE belonging to the third device category.

In some embodiments, the broadcast access key of the first time synchronization service, the broadcast access key of the second time synchronization service and/or the broadcast access key of the third time synchronization service may be transmitted to SIM/UICC of the UEs.

In some embodiments, a random value may be transmitted along with the encrypted SSB or the encrypted SIB.

Figure 5:
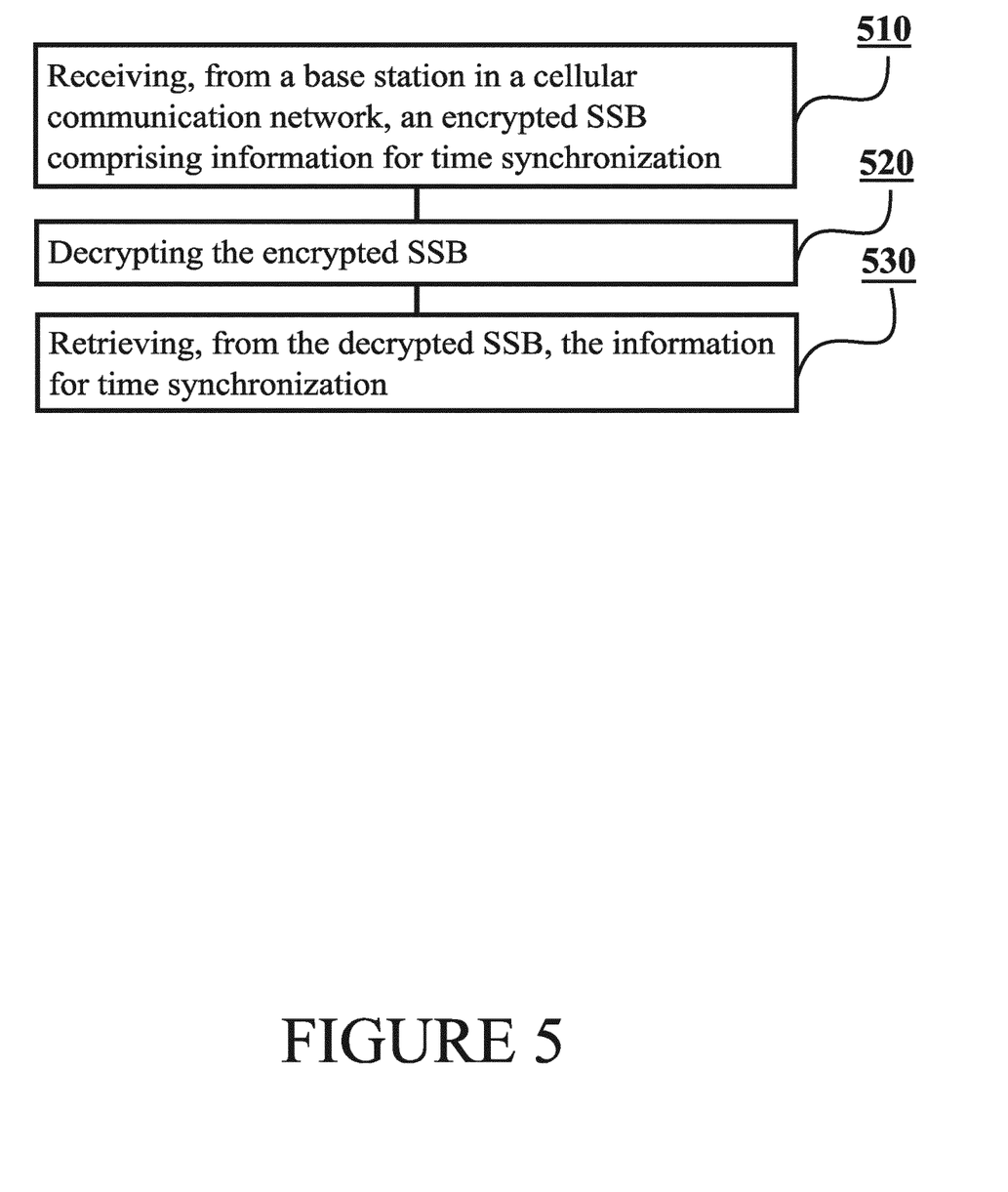
FIG. 5 illustrates a flow graph of a second method in accordance with at least some embodiments.

FIG. 5 is a flow graph of a second method in accordance with at least some embodiments. The phases of the illustrated second method may be performed by UE 110 or by a control device configured to control the functioning thereof, possibly when installed therein.

The second method may comprise, at step 510, receiving, from a base station in a cellular communication network, an encrypted SSB comprising information for time synchronization. The second method may also comprise, at step 520, decrypting the encrypted SSB. Finally, the second method may comprise, at step 530, retrieving, from the decrypted SSB, the information for time synchronization. In some embodiments, the first method may comprise synchronizing UE 110 using the retrieved information for time synchronization, which may further comprises setting a clock of UE 110 according to the retrieved information for time synchronization.

In some embodiments, the information for time synchronization may be retrieved from a BCCH-BCH-Message. Alternatively, or in addition, the SSB may be decrypted using a first encryption key associated with a first time synchronization service.

In some embodiments, the second method may comprise receiving an encrypted SIB comprising the information for time synchronization, decrypting the encrypted SIB, retrieving from the decrypted SIB the information for time synchronization and synchronizing UE 110 using the information for time synchronization, i.e., setting the clock of UE 110 according to the retrieved information for time synchronization. In some embodiments, the SIB may be decrypted using a second encryption key associated with a second time synchronization service.

In some embodiments, the second method may comprise receiving the information for time synchronization using RRC signaling, in addition to the encrypted SIB and SSB, when UE 110 belongs to the third device category for time synchronization. In addition, the second method may comprise synchronizing UE 110 using the information for time synchronization, i.e., setting the clock of UE 110 according to the information for time synchronization.

In some embodiments, UE 110 may belong to a first, second or third device category for time synchronization, wherein less accurate time synchronization is provided for, or achieved by, UEs in the first device category compared to UEs belonging to the second device category and less accurate time synchronization is provided for, or achieved by, UEs in the second device category compared to UEs belonging to the third device category.

In some embodiments, when UE 110 belongs to the first and/or second device category for time synchronization, UE 110 may not be capable of performing uplink transmissions. In some embodiments, when UE 110 belongs to the third device category for time synchronization, UE 110 may be able to perform uplink transmissions.

In some embodiments, the second method may comprise transmitting to a base station a registration request for a first time synchronization service and/or a request for a broadcast access key of the first time synchronization service via a first backend connection, when UE 110 belongs to the first device category for time synchronization. The second method may also comprise receiving, in response to transmitting the request(s), a registration key and/or the broadcast access key of the first time synchronization service from the base station via the first backend connection.

In some embodiments, the second method may comprise transmitting to a base station a registration request for a second time synchronization service and/or a request for a broadcast access key of the second time synchronization service via a second backend connection, when UE 110 belongs to the second device category for time synchronization. The second method may also comprise receiving, in response to transmitting the request(s), a registration key and/or the broadcast access key of the second time synchronization service from the base station via the second backend connection.

In some embodiments, the second method may comprise transmitting to a base station a registration request for a third time synchronization service and/or a request for a broadcast access key of the third time synchronization service via the cellular network, when UE 110 belongs to the third device category. The second method may also comprise receiving, in response to transmitting the request(s), the registration key and/or the broadcast access key of the third time synchronization service via the cellular network.

In some embodiments, the broadcast access key of the first time synchronization service, the broadcast access key of the second time synchronization service and/or the broadcast access key of the third time synchronization service may be received by a SIM/UICC of UE 110.

In some embodiments, a random value may be received along with the encrypted SSB or the encrypted SIB.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, UE 110 or BS 120, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example UE 110 or BS 120, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in cellular communication networks, wherein it is desirable to enable time synchronization via a cellular communication network. More specifically, at least some embodiments find industrial application in 5G/NR networks. For instance, embodiments of the present invention may be applied for 3GPP RAN Rel-16 standardization.

ACRONYMS LIST

3GPP 3rd Generation Partnership Project
BAK Broadcast Access Key
BCCH Broadcast Control Channel
BCH Broadcast Channel
BS Base Station
GPS Global Positioning System
GSM Global System for Mobile communication
HTTP Hypertext Transfer Protocol
IoT Internet of Things
LTE Long-Term Evolution
M2M Machine-to-Machine
mCE messageClassExtension
MIB Master Information Block
MTC Machine-Type Communications
NFC Near-Field Communication
NR New Radio
PBCH Physical Broadcast Channel
PC Personal Computer
RAN Radio Access Network
RAT Radio Access Technology
RRC Radio Resource Control
SFN System Frame Number
SIB System Information Block
SIM Subscriber Identity Module
SRS Sounding Reference Signal
SSB Synchronization Signal Block
TA Timing Advance
TXCO Temperature-Controlled Crystal Oscillator
UE User Equipment
UI User Interface
UICC Universal Integrated Circuit Card
USB Universal Serial Bus
WCDMA Wideband Code Division Multiple Access

REFERENCE SIGNS LIST

| | |
|---|---|
| 110 | UE |
| 115, 125, 135 | Interfaces |
| 120 | BS |
| 130 | Core network |
| 300-370 | Structure of the apparatus of FIG. 3 |
| 410-430 | Phases of the first method in FIG. 4 |
| 510-530 | Phases of the second method in FIG. 5 |

The invention claimed is:

1. An apparatus comprising at least one processor; and at least one memory including computer program code; the at least one memory and the computer program code configured to, with the at least one processor, cause the apparatus at least to:
   embed information for time synchronization to a Synchronization Signal Block, SSB;
   encrypt the SSB; and
   transmit the encrypted SSB comprising the information for time synchronization in a cellular communication network.

2. The apparatus according to claim 1, wherein the information for time synchronization is embedded to a Broadcast Control Channel-Broadcast Channel, BCCH-BCH, message.

3. The apparatus according to claim 1, wherein the SSB is encrypted using a first encryption key associated with a first time synchronization service.

4. The apparatus according to claim 1, wherein the apparatus is further configured to:
   embed the information for time synchronization to a System Information Block, SIB;
   encrypt the SIB; and
   transmit the encrypted SIB in the cellular communication network.

5. The apparatus according to claim 4, wherein the SIB is encrypted using a second encryption key associated with a second time synchronization service.

6. The apparatus according to claim 4, wherein the encrypted SSB is transmitted to at least one user equipment belonging to a first device category for time synchronization and the encrypted SIB is transmitted to at least one user equipment belonging to a second device category for time synchronization.

7. The apparatus according to claim 6, wherein less accurate time synchronization is provided to the at least one user equipment belonging to the first device category for time synchronization than the at least one user equipment belonging to the second device category for time synchronization.

8. The apparatus according to claim 4, wherein the information for time synchronization is transmitted using Radio Resource Control, RRC, signaling, in addition to the encrypted SIB and the encrypted SSB, to at least one user equipment belonging to a third device category for time synchronization.

9. The apparatus according to claim 8, wherein less accurate time synchronization is provided to the at least one user equipment belonging to the second device category for time synchronization than the at least one user equipment belonging to the third device category for time synchronization.

10. An apparatus comprising at least one processor; and at least one memory including computer program code; the at least one memory and the computer program code configured to, with the at least one processor, cause the apparatus at least to:
   receive from a base station in a cellular communication network, by a user equipment, an encrypted Synchronization Signal Block, SSB, comprising information for time synchronization;
   decrypt, by the user equipment, the encrypted SSB; and
   retrieve, by the user equipment, the information for time synchronization from the decrypted SSB.

11. The apparatus according to claim 10, wherein the information for time synchronization is retrieved from Broadcast Control Channel-Broadcast Channel, BCCH-BCH, message.

12. The apparatus according to claim 10, wherein the SSB is decrypted using a first encryption key associated with a first time synchronization service.

13. The apparatus according to claim 10, wherein the apparatus is further configured to:
   receive, by the user equipment, an encrypted System Information Block, SIB, comprising the information for time synchronization;
   decrypt, by the user equipment, the encrypted SIB;
   retrieve, by the user equipment, from the decrypted SIB the information for time synchronization; and
   synchronize, by the user equipment, using the information for time synchronization.

14. The apparatus according claim 13, wherein the SIB is decrypted using a second encryption key associated with a second time synchronization service.

15. The apparatus according to claim 13, wherein the encrypted SSB is received by the user equipment when the user equipment belongs to a first device category for time synchronization and the encrypted SIB is received by the user equipment when the user equipment belongs to a second device category for time synchronization.

16. The apparatus according to claim 15, wherein less accurate time synchronization is achieved by the user equipment when the user equipment belongs to the first device category for time synchronization than when the user equipment belongs to the second device category for time synchronization.

17. The apparatus according to claim 13, wherein the apparatus is further configured to:
   receive, by the user equipment, the information for time synchronization using Radio Resource Control, RRC, signalling, in addition to the encrypted SIB and SSB, when the user equipment belongs to a third device category for time synchronization; and
   synchronize, by the user equipment, using the information for time synchronization.

18. The apparatus according to claim 17, wherein less accurate time synchronization is achieved by the user equipment when the user equipment belongs to the second device category for time synchronization than when the user equipment belongs to the third device category for time synchronization.

19. A method comprising:
   embedding information for time synchronization to a Synchronization Signal Block, SSB;
   encrypting the SSB; and
   transmitting the encrypted SSB comprising the information for time synchronization in a cellular communication network.

20. A method comprising:
   receiving from a base station in a cellular communication network, by a user equipment, an encrypted Synchronization Signal Block, SSB, comprising information for time synchronization;
   decrypting, by the user equipment, the encrypted SSB; and
   retrieving, by the user equipment, the information for time synchronization from the decrypted SSB.

* * * * *